United States Patent
Noguchi et al.

(10) Patent No.: US 6,856,429 B1
(45) Date of Patent: Feb. 15, 2005

(54) IMAGE CORRECTION METHOD, IMAGE CORRECTION DEVICE, AND RECORDING MEDIUM

(75) Inventors: Takafumi Noguchi, Minami-Ashigara (JP); Yoshiya Ohara, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/339,222

(22) Filed: Jun. 24, 1999

(30) Foreign Application Priority Data

Sep. 18, 1998 (JP) .......................................... 10-265330

(51) Int. Cl.[7] .............................. H04N 1/48; H04N 1/56; H04N 1/60
(52) U.S. Cl. ..................... 358/1.9; 358/516; 358/518; 358/521
(58) Field of Search ................................ 358/530, 502, 358/518, 523, 520, 537, 1.9, 516, 521; 382/162, 274, 167

(56) References Cited

U.S. PATENT DOCUMENTS

| | | | | |
|---|---|---|---|---|
| 4,825,297 A | * | 4/1989 | Fuchsberger et al. | 358/447 |
| 5,608,549 A | * | 3/1997 | Usami | 358/530 |
| 6,128,407 A | * | 10/2000 | Inoue et al. | 382/167 |
| 2003/0095269 A1 | * | 5/2003 | Kubo et al. | 358/1.9 |

FOREIGN PATENT DOCUMENTS

| | | | | |
|---|---|---|---|---|
| JP | 05-336287 A | 12/1993 | | H04N/1/00 |
| JP | 6-296231 A | 10/1994 | | H04N/1/40 |

OTHER PUBLICATIONS

Michael Stokes (Hewlett–Packard), Mathew Anderson (Microsoft), Srinivasan Chandrasekar (Microsoft), Rcardo Motta (Hewlett–Packard), "A Standard Default Color Space for the Internet—sRGB", Nov. 5, 1996, Version 1.10, p. 1–17.*

* cited by examiner

*Primary Examiner*—Scott A. Rogers
(74) *Attorney, Agent, or Firm*—Birch, Stewart, Kolasch & Birch, LLP

(57) ABSTRACT

Color correction and density correction are performed on an image without changing the gradation of an image. When color correction and density correction are performed on image data whose values for each R, G, B component color (each channel) of each pixel are coded according to predetermined characteristics, the image data is sampled and correction values are calculated. The image data is then converted (104) to image receptor reflectivity data (r, g, b) (converted to values whose relationship with the light intensity values of each pixel is linear). The image data is then further converted to tristimulus values data (X, Y, Z) and color correction and density correction are carried out. The tristimulus values data after correction (X', Y', Z') is then converted to image receptor reflectivity data (r', g', b') and then to image data (R', G', B'). Accordingly, color and density corrected image data can be obtained without the gradation of the image being changed.

30 Claims, 5 Drawing Sheets

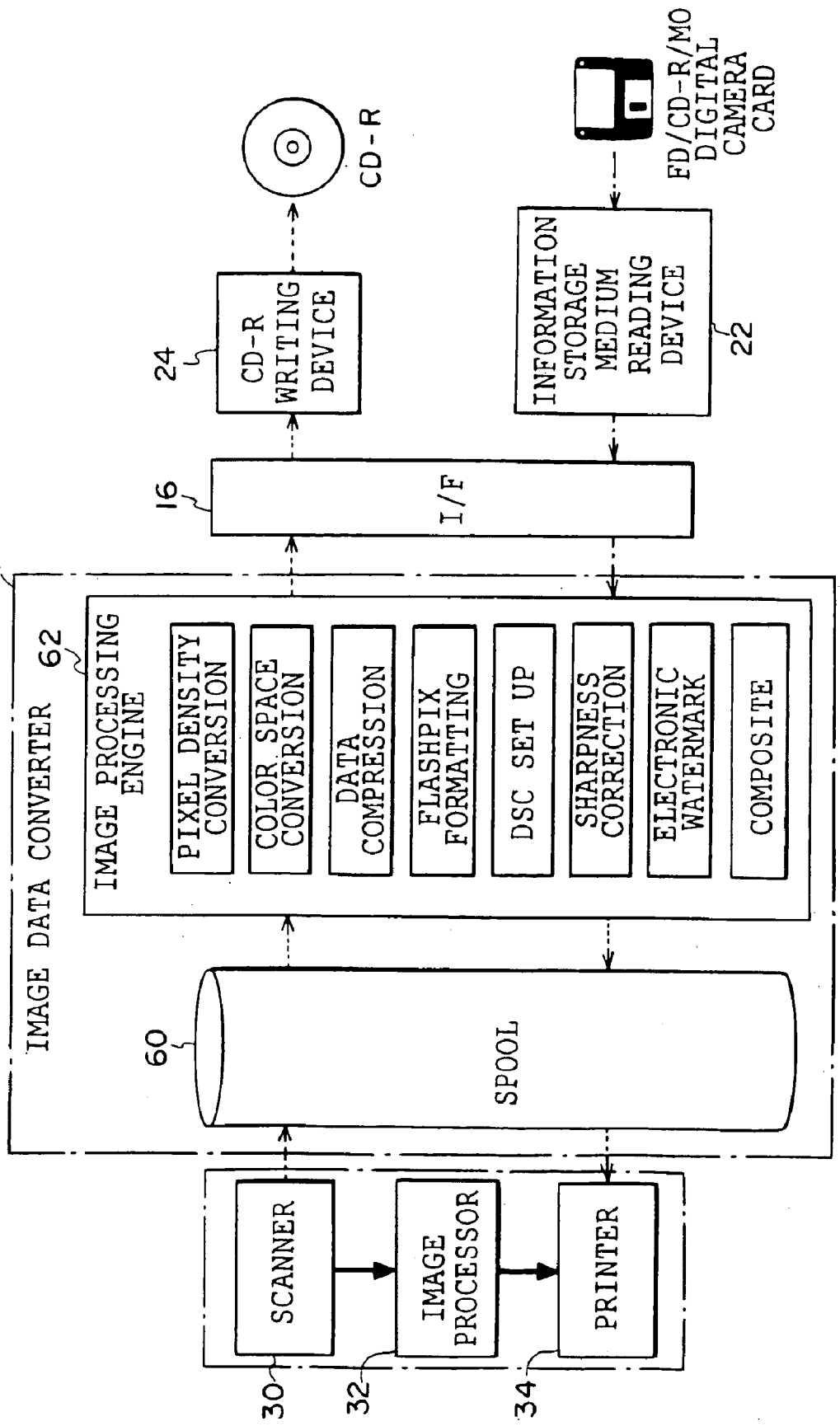

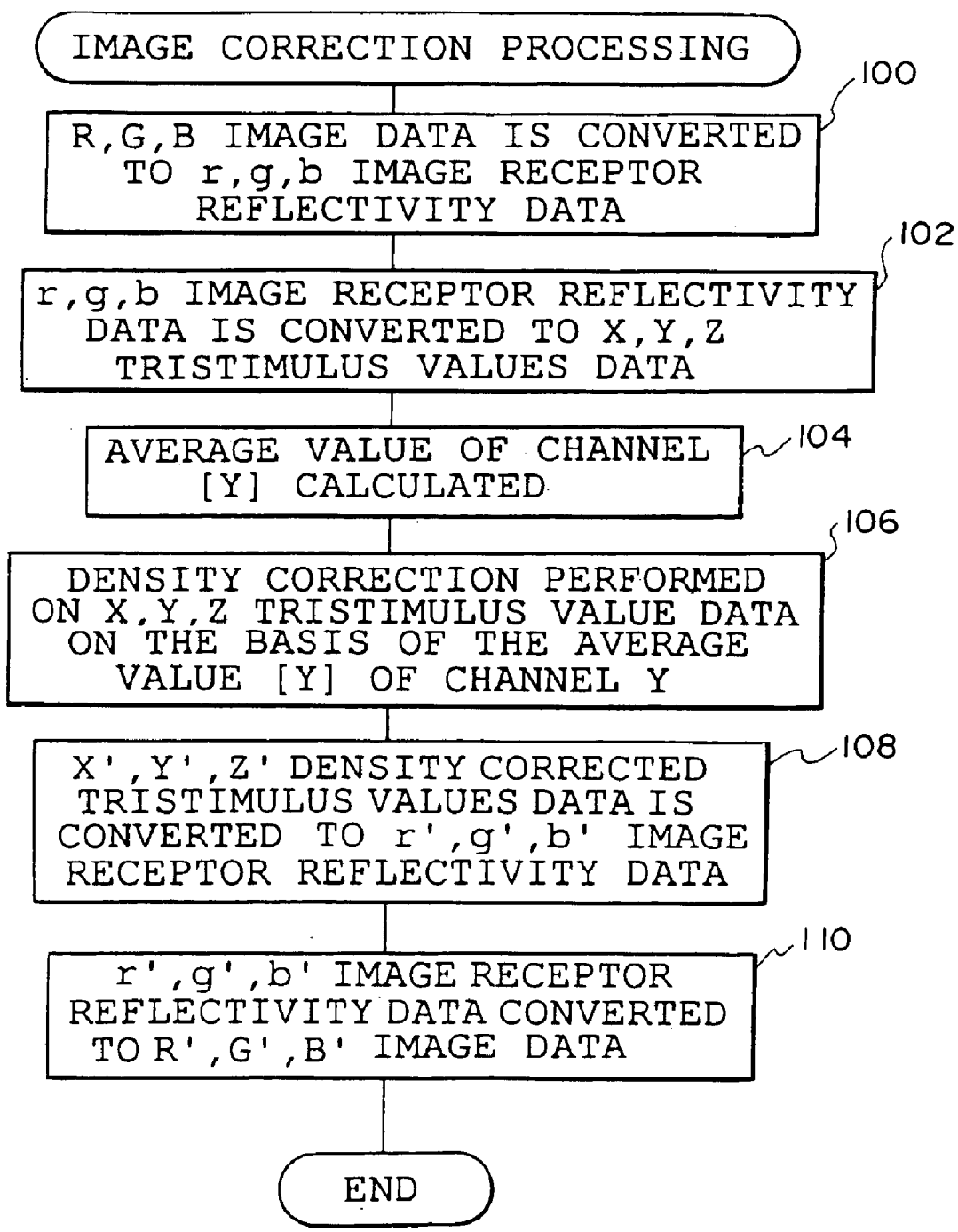

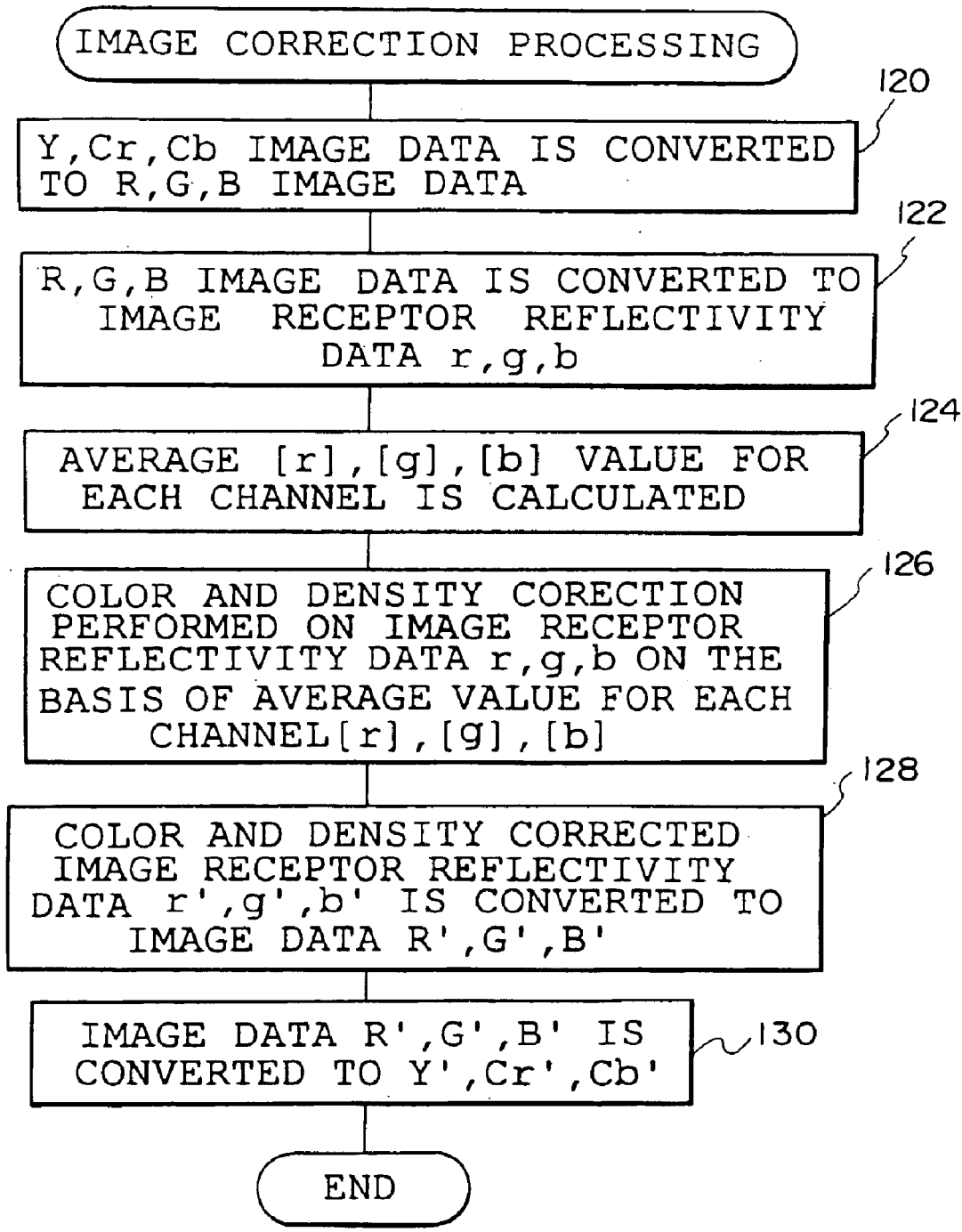

IMAGE CORRECTION METHOD, IMAGE CORRECTION DEVICE, AND RECORDING MEDIUM

BACKGROUND OF THE INVENTION

1. Field of the Invention

The present invention relates to an image correction method, an image correction device, and a recording medium and, particularly, to an image correction method for correcting at least one of a color of an image or a density of an image, an image correction device capable of applying the image correction method, and a recording medium for recording a program for executing the image correction method using a computer.

2. Description of the Related Art

There is a need for performing color correction such as adjustment of the white balance and density correction to rationalize the density over the entire image on images filmed with a video camera or on image data obtained from photography using a digital still camera. Image color correction and image density correction processes generally comprise sampling image data for each of a plurality of channels (e.g. R, G, B) and, on the basis of the data obtained for each channel from the sampling, calculating average values for each channel. Then, on the basis of these calculated average values, correction values for color correction and for density correction are obtained and the image data is converted on the basis of the correction values. For example, using the correction values, in the color correction, the average value of the chromaticity is changed to gray, and, in the density correction, the average value of the luminance is changed to an intermediate value (using a figure such as 0.75 for reflective density, and a figure such as 118 when the image data represents the density of each pixel in 8 bits).

Note that image data conversion corresponding to color correction and density correction is frequently carried out using the conversion formulas shown below.

$$\begin{bmatrix} R' \\ G' \\ B' \end{bmatrix} = \begin{bmatrix} k_r \cdot R \\ k_g \cdot G \\ k_b \cdot B \end{bmatrix} \quad (1)$$

$$\begin{bmatrix} R' \\ G' \\ B' \end{bmatrix} = \begin{bmatrix} k_r \\ k_g \\ k_b \end{bmatrix} + \begin{bmatrix} R \\ G \\ B \end{bmatrix} \quad (2)$$

In the above formulas (1) and (2), (R, G, B) represent image data before correction (namely, the values for the R, G, B of each image pixel), (R', G', B') represent image data after correction, and ($k_r$, $k_g$, $k_b$) represent the conversion coefficients of each channel (corresponding to the conversion values for the color conversion and the density conversion). Formula (1) is the conversion formula for adjusting the gain, while formula (2) is the conversion formula for adjusting the offset. Image data conversion corresponding to color correction and density correction may be carried out using just one of formula (1) and formula (2) or using both formula (1) and formula (2) in combination (known as an affine transformation).

However, the values for each pixel of image data recorded, for example, on an information recording medium by photography using a digital still camera are the digital code values converted (coded) in accordance with the conversion characteristic determined according to the display characteristic which will enable the image to be displayed properly on a display unit (for an example thereof, see FIGS. 1–3). Therefore, the relationship between the digital code values for each pixel of image data and values linear in light intensity such as the reflectivity of the image receptor or the tristimulus values obtained from the reflectivity of the image receptor is not linear as can clearly be seen in FIGS. 1A to 1C.

Note that FIGS. 1A to 1C each show a graph of an example of the image receptor reflectivity/digital code values conversion characteristic (solid line) and the image receptor reflectivity tristimulus values/digital code values conversion characteristic (broken line), wherein the horizontal axis shows the reflectivity of the image receptor or tristimulus values obtained from the reflectivity of the image receptor while the vertical axis shows digital code values (8 bit). FIG. 1A is an example of a real number graph when both the horizontal axis numbers and the vertical axis numbers are real numbers, FIG. 1B is an example of a single logarithm axis graph when the horizontal axis numbers are logarithms and the vertical axis are real numbers, while FIG. 1C is an example of a two logarithm axis graph when both the horizontal axis numbers and the vertical axis numbers are logarithms. Note here that the conversion characteristics in FIGS. 1A to 1C are all determined with consideration given to the characteristics of the display.

Accordingly, if corrections are made to image data as described above, using, for example, formula 1 (this equates to shifting the image data along the vertical axis of the two logarithm axis graph of FIG. 1C), when the corrections are to make the image brighter, then the contrast of the image is greatly increased when seen from the viewpoint of the image receptor reflectivity or the viewpoint of the tristimulus values obtained from the image receptor reflectivity. If the corrections are to make the image darker, then the contrast is greatly reduced when seen from the viewpoint of the image receptor reflectivity or the viewpoint of the tristimulus values obtained from the image receptor reflectivity.

Moreover, if corrections are made to image data as described above, using, for example, formula 2 (this equates to shifting the image data along the vertical axis of the single logarithm axis graph of FIG. 1B), when the corrections are to make the image brighter, then the contrast of the image is id: greatly reduced when seen from the viewpoint of the image receptor reflectivity or the viewpoint of the tristimulus values obtained from the image receptor reflectivity. If the corrections are to make the image darker, then the contrast is greatly increased when seen from the viewpoint of the image receptor reflectivity or the viewpoint of the tristimulus values obtained from the image receptor reflectivity. Thus, the problem arises when carrying out color corrections or density corrections that the image gradation is also changed along with the corrections.

The problem described above is not limited to image data obtained by photography using a digital camera. In fact, the values of each pixel of image data obtained by reading an image recorded on photographic film, for example, also have the problem that the gradation is changed together with the color correction or density correction in the same way as described above. This is because the relationship between the values of each pixel of image data obtained by reading an image recorded on photographic film and the value of the light intensity is not linear due to the characteristic of the amount of exposure of the photographic film/color formation density and the characteristic of the amount of light received by the reading sensor/output signal not being linear.

The present invention was achieved in consideration of the above and it is an object thereof to provide an image correction method, an image correction device, and a recording medium which can perform color correction and density correction of an image without changing the gradation thereof.

SUMMARY OF THE INVENTION

In order to achieve the above aims, in the image correction method according to the first aspect of the present invention, a first conversion is performed in which digital code values of each pixel of image data representing an image to be corrected are converted to values whose relationship with light intensity values or logarithm of light intensity values is linear, a second conversion is performed in which at least one of the color or density of the color or density of the image to be corrected which is represented by the image data is corrected after the image data has undergone the first conversion, and a third conversion is performed in which the values of each pixel of the image data are restored to the digital code values after the image data has undergone the second conversion.

In the first aspect of the present invention, a first conversion is performed in which digital code values of each pixel of image data representing an image to be corrected are converted to values whose relationship with light intensity values or logarithm of light intensity values is linear. Examples of values which may be used as the values whose relationship with the light intensity values is linear include the image receptor reflectivity values and the tristimulus values in the XYZ calorimetric system obtained from the image receptor reflectivity values (referred to below simply as tristimulus values). Moreover, the conversion characteristic in the first conversion can be determined in accordance with the relationship between the digital code values and the light intensity values (or between the digital code values and the logarithm of light intensity values). After the image data has undergone the first conversion, the data undergoes a second conversion in which at least one of the color or density of the image to be corrected which is represented by the image data is corrected.

When the digital code values of each pixel of the image data are converted by the first conversion to values whose relationship with the light intensity values is linear, because the values for each pixel of the image data after the conversion have been changed to values whose relationship with the light intensity values is linear, then the gradation of the image does not change even if at least one of the color and density are corrected by a second conversion. In addition, multiplying and dividing the anti-logarithm values is equivalent to adding and subtracting logarithmic values. Because the second conversion (the correction of at least one of the color and density) performed on the image data, after the values for each pixel have been converted into values whose relationship with the light intensity values is linear, can be achieved by performing a multiplication/division calculation on the image data (see formula (1)), then even when the digital code values for each pixel of the image data are converted by the first conversion into values whose relationship with the logarithmic values of the light intensity is linear, the color and/or the density are corrected by an addition/subtraction calculation in the second conversion resulting in changes in the gradation of the image being avoided.

Because there is a further third conversion performed on the data which has undergone the second conversion to restore the values for each pixel to digital code values (the conversion characteristic in the third conversion can also be determined in accordance with the relation between the digital code values and the light intensity values or between the digital code values and the logarithm of light intensity values), image data can be obtained for an image on which only one of either color or density correction has been performed without the gradation of the image being changed. Accordingly, according to the first aspect of the present invention, color correction and density correction can be performed on an image with no change in the gradation of the image.

Note that when the image data representing the image to be corrected is image data obtained by converting values of the light intensity of each component color of each pixel of the image to be corrected or values related to the light intensity (e.g. light reflectivity, density, luminance, and the like) to digital code values in accordance with predetermined conditions (for example, conversion conditions in which the relationship between the digital code values for each pixel and the light intensity values is non-linear such as conversion conditions regulated by the relational formula below), then, in the second aspect of the present invention, at least one of the first or third conversions is performed, with A', B', C' as values having a linear relationship with the light intensity values, and in accordance with the relational formula $$A=e(a \cdot A')\ B=e(a \cdot B')\ C=e(a \cdot C')$$

when the digital code values A, B, C are not greater than a predetermined value f, and in accordance with the relational formula $$A=e(b \cdot A'^c - d)\ B=e(b \cdot B'^c - d)\ C=e(c \cdot C'^c - d)$$

when the digital code values A, B, C are greater than a predetermined value f (wherein, a, b, c, d, e, f are constants).

Optional values may be used for the constants a, b, c, d, e, f in the relational formulas given above, however, the two conversion characteristics shown in FIGS. 1A–1C are each defined by a formula in which a predetermined number is substituted for each constant in the above relational formulas. Accordingly, according to the second aspect of the present invention, when the digital code values of the image data representing the image to be corrected have been determined in accordance with a conversion characteristic defined by the above relational formulas, then by appropriately determining each constant in the above relational formulas, at least one of the first conversion (the conversion of the digital code values into values whose relationship with the light intensity values is linear) or the third conversion (the inverse conversion to the first conversion) can be performed with a high degree of accuracy.

According to the third aspect of the present invention, the second conversion in the image correction method according to the first aspect of the present invention is an affine transformation.

The image correction device according to the fourth aspect of the present invention comprises a first conversion means for performing a first conversion in which digital signal values for each pixel of image data representing an image to be corrected are converted to values whose relationship with light intensity values or logarithm of light intensity values is linear, second conversion means for performing a second conversion in which at least one of the color or density of the image to be corrected which is represented by the image data is corrected after the image data has undergone the first conversion, and third conversion means for performing a third conversion in which the values for each pixel of the image data are restored to the digital signal values after the image data has undergone the second conversion.

In the fourth aspect of the present invention, the first conversion means converts digital signal values for each pixel of image data representing an image to be corrected to values whose relationship with the light intensity values or logarithm of light intensity values is linear. The second conversion means performs a conversion in which at least one of the color or density of the image to be corrected which is represented by the image data is corrected after the image data has undergone the first conversion. The third conversion means restores the values for each pixel of the image data to the digital signal values after the image data has undergone the second conversion. Therefore, in the same way as in the first aspect of the present invention, the color and density of the image can be corrected with no change being made to the gradation of the image.

On the recording medium according to the fifth aspect of the present invention is recorded a program for executing on a computer a process including a first step for carrying out a first conversion in which digital signal values for each pixel of image data representing an image to be corrected are each converted to values whose relationship with the light intensity values or the logarithm of light intensity values is linear, a second step for carrying out a second conversion in which at least one of the color or density of the image to be corrected which is represented by the image data is corrected, and a third step for carrying out a third conversion in which the values for each pixel of image data which has undergone the second conversion are restored to the digital signal values.

Because a program for executing on a computer processes including the above-described first through third steps, namely the processes of the image correction method according to the first aspect of the present invention, is recorded on the recording medium according to the fifth aspect of the present invention, then, in the same way as in the first aspect of the present invention, the color and density of an image can be corrected with no change being made to the gradation of the image by the computer reading the program recorded on the recording medium and executing that program.

BRIEF DESCRIPTION OF THE DRAWINGS

FIG. 1A is an example of a real number graph when both the horizontal axis numbers and the vertical axis numbers are real numbers, FIG. 1B is an example of a single logarithm axis graph when the horizontal axis numbers are logarithms and the vertical axis are real numbers, while FIG. 1C is an example of a two logarithm axis graph when both the horizontal axis numbers and the vertical axis numbers are logarithms.

FIG. 3 is a conceptual view showing the sequence of the processes performed on image data when an information recording medium reading device is connected to the information processing system in FIG. 2 as an input device, and a CD-R writing device is connected to the information processing system in FIG. 2 as a writing device.

FIG. 4 is a flow chart showing the details of the image correction processes performed on image data (R, G, B).

FIG. 5 is a flow chart showing the details of the image correction processes performed on image data Y, Cr, Cb).

DESCRIPTION OF THE PREFERRED EMBODIMENTS

Figure 2:
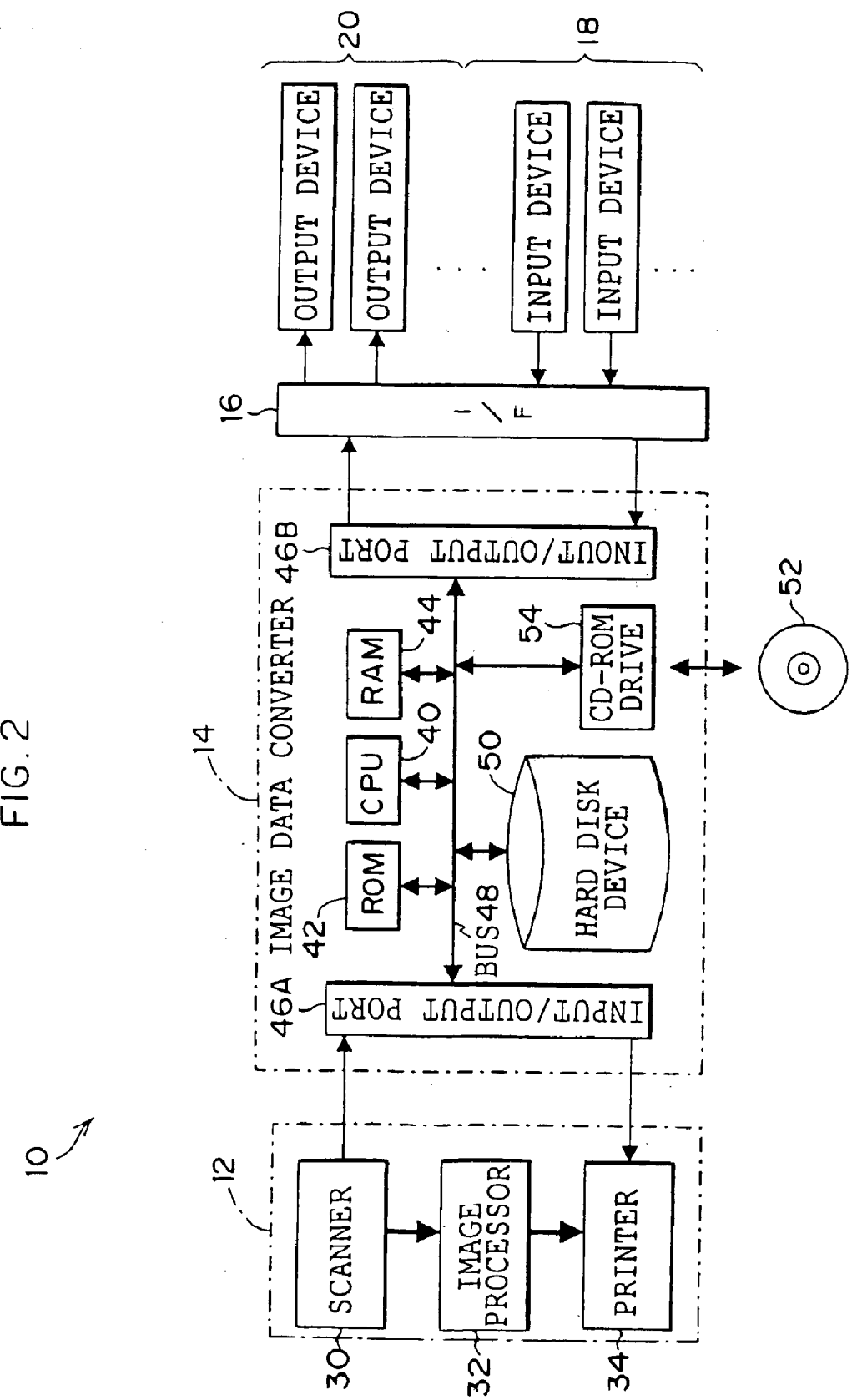
FIG. 2 is a block diagram schematically showing the structure of an image processing system according to the present embodiment.

A detailed example of an embodiment of the present invention will now be given with reference to the drawings. FIG. 2 shows the image processing system 10 according to the present embodiment. The image processing system 10 comprises a digital laboratory system 12 to which are connected a group of input devices 18 and a group of output devices 20 via an image data converter 14 and an interface (I/F) circuit 16. The digital laboratory system 12 is constructed so that film images recorded on a photosensitive material such as a negative photographic film or a reversal photographic film (hereafter abbreviated to 'photographic film') can be read and recorded on photographic paper at rapid speed ('film images' here means negative or positive images visualized by photographing an image receptor and then performing developing processing).

The group of input devices 18 comprises various types of input devices for inputting image data to the image data converter 14. Examples of input devices which may be suitably used to form the group of input devices 18 include information storage medium reading devices 22 (see FIG. 3), in which one of a variety of information storage mediums such as magnetic disks such as floppy disks (FD), optical disks such as CD-R, magneto-optical disks (MO), PC cards and IC cards (hereafter, these are referred to as digital camera cards) which may be loaded into digital still cameras (DSC: hereafter, abbreviated to digital cameras) can be set and the image data stored on the information storage medium read and input. Other examples include communication control devices (not shown in the figures) which receive image data sent from a separate information processor connected to the communication control device via a communication network and then input the data.

The group of output devices 20 comprises various types of output devices which perform output processing on an image on the basis of image data for outputting data transferred from the image data converter 14. Examples of output devices which may be suitably used to form the group of output devices 20 include information storage medium writing devices which perform an image output process by writing image data to an information storage medium (e.g. a CD-R), (an example thereof is the CD-R writing device 24 shown in FIG. 3 which writes image data to a CD-R serving as an information storage medium) Other example include an image display device which perform an image output process by displaying an image on a display means such as a display unit, and a communication control device which performs an image output process by sending image data to a separate information processor connected to the communication control device via a communication network.

However, the file structures of the image data input from each of the input devices forming the group of input devices 18 are not uniform and are often different from each other. Therefore, when image data is input from an input device, the I/F circuit 16 determines the file structure of the input image data, converts the file structure to a predetermined file structure, and inputs this to the image data converter 14. Moreover, the output devices regulate in advance the file structure of image data input from an outside device, however, this file structure is often different for each of the various output devices forming the group of output devices 20. Therefore, when image data is transferred from the image data converter 14 to the output device, the I/F circuit 16 converts the file structure of the transferred file data to match the output device to which it is being transferred.

The digital laboratory system 12 is formed with a scanner 30, an image processor 32, and a printer 34 connected in series. The scanner 30 is provided with a reading sensor such as an area CCD sensor and uses this sensor to read film images recorded on a photographic film. The image data obtained by reading the film image is output to the image processor 32 and can be used in image processing by the printer 34 (for recording the image on photographic paper), however, image data indicated for use in image output processing using an output device other than the printer 34 is also output to the image converter 14.

The image processor 32 is provided with a variety of image processing circuits (not shown in the figure) to perform various types of image processing such as pixel density conversion, color conversion, and hyper-tone processing to compress the gradation of the extremely low frequency luminance component of the image, hyper-sharpness processing to intensify the sharpness of an image while suppressing the graininess thereof, and special image processing (such as correcting image defects arising from lens aberrations in the LF (film with attached lens) in film images recorded by photography using an LF) on the input image data. These types of image processing are performed in order to record an image with an appropriate image quality on photographic paper by exposure thereof. The image processor 32 calculates the processing conditions for the image processing carried out by each image processing circuit. Each image processing circuit carries out the various types of image processing on the data for each image in accordance with the calculated processing conditions. After the image processing, the image data is output to the printer 34 as image data for recording.

The printer 34 is provided with R, G, B laser light sources and unillustrated laser drivers for controlling the operation of the laser light sources. The R, G, B laser light emitted from the laser light sources is modulated using the input image data for recording and the modulated laser light is scanned onto the photographic paper. Accordingly, an image is recorded on photographic paper by being exposed thereon. The photographic paper which has had the image exposure-recorded thereon, is fed to an unillustrated processor section where color formation developing, bleaching, fixing, washing, and drying processes are carried out to visualize the image exposure-recorded on the photographic paper. The image data transferred to the printer 34 from the image data converter 14 is also used for the laser modulation in the same way as is described above, namely, it is used for exposure-recording the image onto the photographic paper.

As is shown in FIG. 2, the image data converter 14 is provided with an information processor such as a work station or a personal computer having a structure in which a CPU 40, ROM 42, RAM 44, input/output ports 46A and 46B are connected to each other via a bus 48. In addition, the image data converter 14 is provided with a hard disk device 50 connected to the bus 48 and having a large volume information storage medium (hard disk) contained therein, and a CD-ROM drive 54 for reading programs and so on from a CD-ROM 52 which is loaded in the CD-ROM drive 54. The scanner 30 and the printer 34 of the digital laboratory system 12 are connected to the input/output port 46A while a group of input devices 18 and a group of output devices 20 are connected to the input/output port 46B via an I/F circuit 16.

The image data converter 14 temporarily stores image data, input from the scanner 30 and each input device in the group of input devices 18, in the hard disk contained in the hard disk device 50. Accordingly, the hard disk contained in the hard disk device 50 functions as a spool 60 (see FIG. 3) for accumulating and storing image data input to the image data converter 14. Moreover, the image data converter 14 attaches property information, which shows the attributes and so on of the image data, to the input image data and then temporarily stores it in the spool 60.

Moreover, a variety of image processing programs for performing various types of image processing on the image data are stored in the hard disk contained in the hard disk device 50. When necessary, the CPU 40 of the image data converter 14 selectively executes these programs at predetermined times (at least one of the following two times: before the image data is temporarily stored on the spool 60; and after the data temporarily stored on the spool 60 has been read) and performs various types of image processing on the image data. In this way, the image data converter 14 is also provided with the function of image processing engine 62 (see FIG. 3) for performing various types of image processing.

In the present embodiment, as can also be seen in FIG. 3, a variety of types of image processing are available to perform on the image data. The types of image processing include: Pixel density conversion, where the data of a single image may be converted to the data of an image having a different pixel density (number of pixels); Color space conversion, where the data of a single image is converted to the data of an image having a different color space; data compression (and data decompression); FlashPix formatting, where the data of a single image is converted to (or reconverted from) image data in a predetermined format called FlashPix (a format which contains the image data of a plurality of different resolutions and in which the respective image data of each resolution is separated into a plurality of small areas called 'tiles'); DSC set up, which is a processing designed to improve the image quality of image data obtained by photography using a digital camera; Sharpness correction, where the sharpness of an image is improved; Electronic watermarking, where predetermined electronic watermark data for preventing inaccurate reproduction and so on of the image data is embedded in the image data; and Composite, where a plurality of types of image data are synthesized to form the image data of a single image (for example, the image data to create a New Year's greeting card or the like).

Among the above types of image processing, DSC set up comprises an image correction processing in which the image correction method of the present invention is applied (explained in detail below), and a color conversion processing in which the color of an image is made brighter. An image correction program for performing image correction processing in the CPU 40 of the image data converter 14 is initially stored on the CD-ROM 52 together with programs for performing other types of image processing in the CPU 40. The CD-ROM 52 is loaded in the CD-ROM drive 54 and, when an instruction is given to install a program from the CD-ROM 52 on the image data converter 14, the image correction program or another program is read from the CD-ROM 52 by the CD-ROM drive 54 and is stored on the hard disk contained in the hard disk device 50.

When the time arrives for the image correction processing to be performed, the image correction program is read from the hard disk contained in the hard disk device 50 and is stored in the RAM 44 (the system may also be set up so that the program for each image processing is read and stored in the RAM 44 each time the image data converter 14 is turned on). The image correction program is then executed by the CPU 40 of the image data converter 14. The image data converter 14 thus functions as the image correction device of the present invention. Note that the other image processing programs are also read and executed in the same way as described above.

In this way, the CD-ROM 52 and the hard disk contained in the hard disk device 50 for storing the image correction program and other image processing programs correspond to the recording medium of the present invention.

As an operation of the present embodiment, an explanation is given next of the transfer of image data from the information storage medium reading device 22 to the printer 34 of the digital laboratory system 12, using an aspect where the information storage medium reading device 22 (or the CD-R writing device 24) is connected to the image data converter 14 as an example.

In the image processing system 10, firstly a FD or MO on which is stored image data processed by an information processor such as the user's own personal computer may be brought in and the creation of a print requested. Alternatively, a digital camera card on which is stored image data obtained by photography using a digital camera may be brought in and the creation of a print requested, a CD-R on which is written image data transferred from a scanner 30 via the image data converter 14 and the CD-R writing device 24 may be brought in and the creation of a print (or an extra printing) requested.

The information storage medium brought in by the user is then set in the corresponding information storage medium reading device 22 (FD drive, CD drive, MO drive, card reader, etc.). The information storage medium reading device 22 in which the information storage medium has been set reads the image data of the image to be processed from the information storage medium and transfers the read image data to the image data converter 14 together with attribute data showing various attributes of the image data of the image to be processed and the information that the output destination of the image data is the printer 34.

The image data transferred from the information storage medium reading device 22 is input to the image data converter 14 after being converted to a predetermined file structure by the I/F circuit 16. The image processing engine 62 of the image data converter 14 verifies that the image data input source is the information storage medium reading device 22, and verifies, from the information input together with the image data expressing the output destination of the image data, that the input image data to be processed should be output to the printer 34. The image processing engine 62 of the image converter 14 also performs the optimum image processing in accordance with the attributes of the image data to be processed which depend on the input source (the type of information storage medium reading device 22) and the output destination (printer 34) before the image data to be processed is stored on the spool 60.

At this point, when the information storage medium reading device 22 of the input source is a device which reads image data from a digital camera card (a card reader), the image processing engine 62 determines that the input image data is image data which has been created by photography using a digital camera and stored on a digital camera card (in this case, the data has been compressed and stored). The image processing engine 62 then performs various types of image processing such as decompressing the compressed image data, converting the decompressed image data to image data having a resolution (pixel density) suitable for the recording of an image on photographic paper, performing DSC set up including image correction processing, and carrying out sharpness correction to improve the sharpness of the image.

An explanation will now be given of image correction processing performed when the image correction engine 62 (i.e. the CPU 40 of the image data converter 14) executes an image correction program when the image data to be processed is read from a digital camera card.

Firstly, with reference to FIG. 4, an explanation will be given for a case when the image data to be processed is image data (R, G, B) having the values of each of the R, G, B component colors (each channel) of each pixel thereof coded in accordance with a predetermined conversion characteristic. In image data stored on a digital camera card by photography using a digital camera, the reflectivity X (whose value is set at between 0–1) of the receptor is assigned (integerized and then coded) an 8-bit digital code value(a value between 0–255) by the function F (X) shown in formula (3) below.

$$255 \cdot (1.099 \cdot X^{0.45} - 0.99) \quad (0.018 < X \leq 1.0)$$

Note that formula (3) corresponds to the relational expression in the second aspect of the present invention. In formula (3), the values of each of the constants a, b, c, d, e, f in the second aspect of the present invention are set as a=4.50, b=−1.099, c=0.45, d=0.099, e=255, and f=0.018, and show the conversion characteristics shown by the solid lines in FIGS. 1A–1C. Note also that the value 255 of the constant e is a value for assigning to an 8-bit digital code value and is set according to the bit depth (number of bits per single pixel) of the image data. As is evident from formula (3), the relationship between the digital code value for each pixel of the image data from a digital camera and the light intensity values is not linear and if direct color correction and density correction of the image data from a digital camera are performed, the gradation of the image changes together with the correction.

Therefore, in step 100, the (R, G, B) image data is converted to image receptor reflectivity data (r, g, b), expressing the reflectivity of the image receptor, before the color correction and density correction. This conversion (refer to the following formula) is achieved by performing an inverse conversion of the function F (a conversion using function $F^{-1}$)

$$r \rightarrow F^{-1}(R), \ g \rightarrow F^{-1}(G), \ b \rightarrow F^{-1}(B)$$

Accordingly, the values of each channel of each pixel of the (R, G, B) image data are converted to image receptor reflectivity values whose relationship with the light intensity values is linear. This step 100 and the next step 102 correspond to the first conversion of the present invention (the first conversion means in the fourth aspect of the present invention), and, in particular, step 100 corresponds to the first conversion in the second aspect of the present invention.

In step 102, the image receptor reflectivity data (r, g, b) obtained in step 100 is further converted to data of the tristimulus values (X, Y, Z). The conversion from image receptor reflectivity data to tristimulus values data is achieved, for example, by a matrix calculation as is shown in the following formula (4).

$$\begin{bmatrix} X \\ Y \\ Z \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix}^{-1} \begin{bmatrix} r \\ g \\ b \end{bmatrix} \quad (4)$$

In the next step 104, the average value [Y] of channel Y of the tristimulus values data (X, Y, Z) is calculated as the density correction value. In the next step 106, density correction is performed on the (X, Y, Z) tristimulus values data obtained in step 102 on the basis of the average value [Y] of the channel Y obtained in step 104. This density correction is made, for example, on the basis of the following formula (5).

$$X' = X \quad Y' = \frac{0.18}{[Y]} \quad Z' = Z \quad (5)$$

Because the (X, Y, Z) tristimulus values data (values) has a linear relationship with the light intensity values, the gradation of the image does not change even when the density correction of formula (5) is performed. Note that instead of the correction of formula (5), adjustment of the gain only as in formula (1) or adjustment of the offset only as in formula (2) may be made. This step 108 corresponds to the second conversion of the present invention (the second conversion means in the fourth aspect of the present invention).

In the next step 108, the tristimulus values data (X', Y', Z') which has undergone color correction and density correction is converted to image receptor reflectivity data (r', g', b'). This conversion is also achieved using a matrix calculation as shown in the following formula (6).

$$\begin{bmatrix} r' \\ g' \\ b' \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X' \\ Y' \\ Z' \end{bmatrix} \quad (6)$$

In step 110, the (r', g', b') image receptor reflectivity data is converted to (R', G', B') image data. This conversion can be performed using the function F shown in FIG. 3 (see the formula below).

$$R' \leftarrow F(r'), \; G' \leftarrow F(g'), \; B' \leftarrow F(b')$$

Accordingly, color corrected and density corrected image data (R', G', B') can be obtained without the image gradation changing. The steps 108 and 110 correspond to the third conversion of the present invention (the third conversion means in the fourth aspect of the present invention). Step 110, in particular, corresponds to the third conversion in the second aspect of the present invention. If all of the different conversions of the image data in the above-described color correction and density correction processes are arranged together, the following is obtained.

$$\begin{bmatrix} R \\ G \\ B \end{bmatrix} \xrightarrow{F^{-1} \text{ Conversion}} \quad (7)$$

$$\begin{bmatrix} r \\ g \\ b \end{bmatrix} \xrightarrow{\text{Matrix calculation}} \begin{bmatrix} X \\ Y \\ Z \end{bmatrix} \xrightarrow{\text{Correction}} \begin{bmatrix} X' \\ Y' \\ Z' \end{bmatrix} \xrightarrow{\text{Matrix calculation}} \begin{bmatrix} r' \\ g' \\ b' \end{bmatrix} \xrightarrow{F \text{ conversion}} \begin{bmatrix} R' \\ G' \\ B' \end{bmatrix}$$

On the other hand, when the image data to be process is image data (Y, Cr, Cb) in which the values of the luminance Y and color differences [[CR]] Cr and Cb of each channel are coded in accordance with a predetermined conversion characteristic, then the image correction processing shown in FIG. 5 is performed. Namely, in step 120, (Y, Cr, Cb) image data is converted to (R, G, B) image data. In this conversion, firstly, the Luma, Chroma 1, Chroma 2 data for each pixel [[is]] are obtained from Cr and Cb color difference data in accordance with relational formula shown in formula (7) below.

$$Y = (255/1.402)\text{Luma} \quad Cr = 111.40 \text{ Chroma } 1 + 156 \quad (7)$$

$$Cb = 135.64 \text{ Chroma } 2 + 137$$

Subsequently, the R, G, B image data is obtained from the Luma, Chroma 1, Chroma 2 data for each pixel using formula (8) below, thus giving the (R, G, B) image data. Note that this conversion is a type of affine transformation.

$$\begin{bmatrix} R \\ G \\ B \end{bmatrix} = \begin{bmatrix} 0.299 & 0.587 & 0.114 \\ -0.299 & -0.587 & 0.886 \\ 0.701 & -0.587 & -0.114 \end{bmatrix}^{-1} \begin{bmatrix} \text{Luma} \\ \text{Chroma 1} \\ \text{Chroma 2} \end{bmatrix} \quad (8)$$

In the next step 122, in the same way as was explained for step 100, the (R, G, B) image data is converted to image receptor reflectivity data (r, g, b). Accordingly, the values for each channel of each pixel of the (Y, Cr, Cb) image data (digital code values) are converted to image receptor reflectivity values whose relationship with the light intensity values is linear. Step 122 corresponds to the first conversion of the present invention (the first conversion means in the fourth aspect of the present invention) and, more specifically, corresponds to the first conversion of the second aspect of the present invention.

In the next step 124, the average values [r], [g], [b] are calculated as color and density correction values for each channel of the image receptor reflectivity data (r, g, b). Subsequently, in the next step 126, color and density correction are performed on the (r, g, b) image receptor reflectivity data obtained in step 122 on the basis of the average values [r], [g], [b] for each channel obtained in step 124. This color correction and density correction can be performed on the basis, for example, of formula (9) below (known as an affine transformation).

$$\begin{bmatrix} r' \\ g' \\ b' \end{bmatrix} = \frac{0.18 \, [g]}{0.3[r] + 0.6[g] + 0.1[b]} \quad 9$$

$$\begin{bmatrix} 1/[r] & 0 & 0 \\ 0 & 1/[g] & 0 \\ 0 & 0 & 1/[b] \end{bmatrix} \cdot \begin{bmatrix} r \\ g \\ b \end{bmatrix}$$

Because the (r, g, b) image receptor reflectivity data (values) has a linear relationship with the light intensity values in the same way as the (X, Y, Z) tristimulus values data, the gradation of the image does not change even when color correction and density correction are performed in accordance with formula (9). Note that instead of using formula (9) for the correction, adjustment of the gain only as in formula (1) or adjustment of the offset only as in formula (2) may be performed. Step 126 corresponds to the second conversion of the present invention (the second conversion means in the fourth aspect of the present invention).

Note also that, in the same way as the color correction and density correction processes shown in FIG. 4, the density of the (X, Y, Z) tristimulus values data may be corrected after the (r, g, b) image receptor reflectivity data has been converted to (X, Y, Z) tristimulus values data. Moreover, in the image correction process shown in FIG. 4, the color and density of the image receptor reflectivity data may be corrected in the same way as described above.

In step 128, the color and density corrected image receptor reflectivity data (r', g', b') is converted to (R', G', B') image data in the same way as in step 112 described above. Subsequently, in step 130, the (R', G', B') image data is converted to (Y', Cr', Cb') image data. In this conversion, firstly the Luma, Chroma 1, and Chroma 2 data is obtained for each pixel from formula (10) below.

$$\begin{bmatrix} \text{Luma} \\ \text{Chroma 1} \\ \text{Chroma 2} \end{bmatrix} = \begin{bmatrix} 0.299 & 0.587 & 0.114 \\ -0.299 & -0.587 & 0.886 \\ 0.701 & -0.587 & -0.114 \end{bmatrix} \begin{bmatrix} R \\ G \\ B \end{bmatrix} \quad (10)$$

Subsequently, in accordance with formula (7), the luminance data Y' and the color difference data Cr' and Cb' are obtained from the Luma, Chroma 1, and Chroma 2 data. Accordingly, color and density corrected image data (Y', Cr', Cb') can be obtained without the image gradation changing. Steps 128 and 130 correspond to the third conversion of the present invention (the third conversion means in the fourth aspect of the present invention). Step 128, in particular, corresponds to the third conversion in the second aspect of the present invention. If all of the different conversions of the image data in the above-described image correction processes are arranged together, the following is obtained.

$$\begin{bmatrix} Y \\ Cr \\ Cb \end{bmatrix} \xrightarrow[\text{conversion}]{\text{Affine}} \begin{bmatrix} R \\ G \\ B \end{bmatrix} \xrightarrow[\text{conversion}]{F^{-1}} \begin{bmatrix} r \\ g \\ b \end{bmatrix} \xrightarrow{\text{Correction}} \begin{bmatrix} r' \\ g' \\ b' \end{bmatrix} \xrightarrow{F \text{ conversion}} \begin{bmatrix} R' \\ G' \\ B' \end{bmatrix} \xrightarrow[\text{conversion}]{\text{Affine}}$$

$$\begin{bmatrix} Y' \\ Cr' \\ Cb' \end{bmatrix}$$

Note that as the above relational formula in the second aspect of the present invention, formula (3) was used in which the values of the constants a, b, c, d, e, and f are a=450, b=1.099, c=0.45, d=0.099, e=255, and f=0.018, however, the present invention is not limited to this and formula (11) below, for example, may be used in which the values of the constants a, b, c, d, e, and f are a=12.92, b=1.055, c=1/2.40, d=0.055, e=255, and f=0.0034 (wherein the value of the constant e is able to be variably set to suit the bit depth of the image data).

$$F(X) = \begin{cases} 255 \cdot = (12.92 \cdot X) & (0.0 \le X \le 0.0034) \\ 255 \cdot (1.055 \cdot X^{(1/2.40)} - 0.055) & (0.0034 < X \le 1.0) \end{cases} \quad (11)$$

Figure 1A:
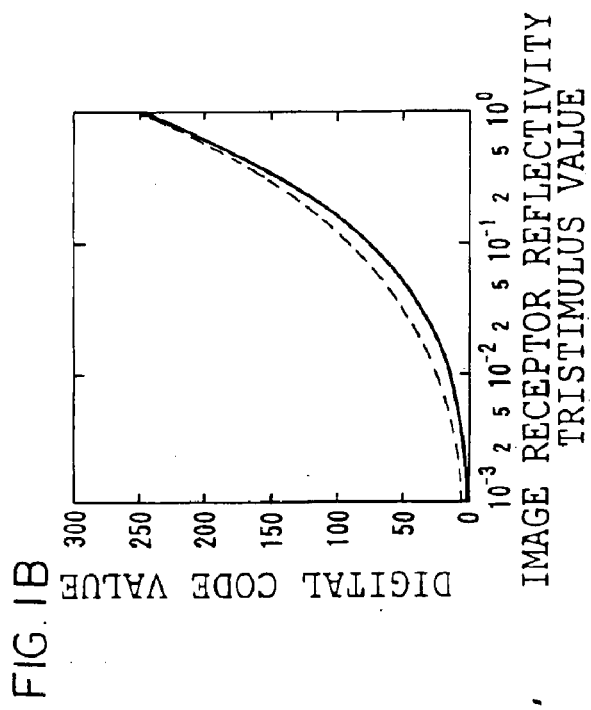
FIGS. 1A through 1C each show a graph of an example of the image receptor reflectivity/digital code values conversion characteristic and the image receptor reflectivity tristimulus values/digital code values conversion characteristic, wherein the horizontal axis shows the reflectivity of the image receptor or tristimulus values obtained from the reflectivity of the image receptor while the vertical axis shows digital code values (8 bit).
Figure 1B:
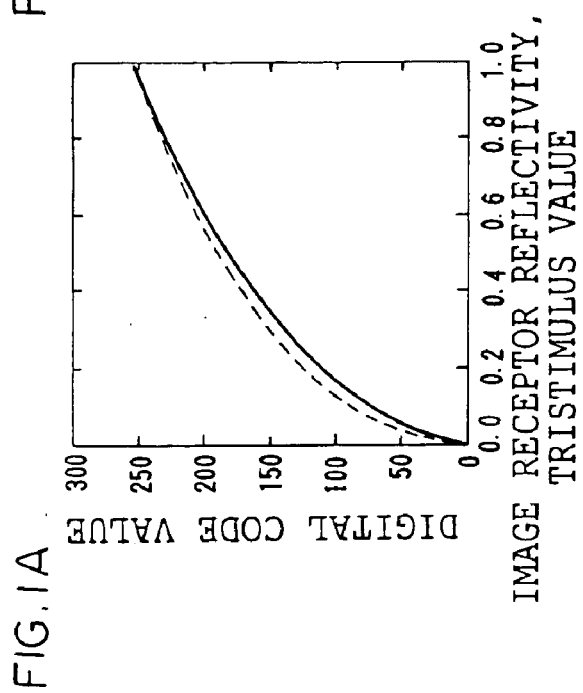
Figure 1C:
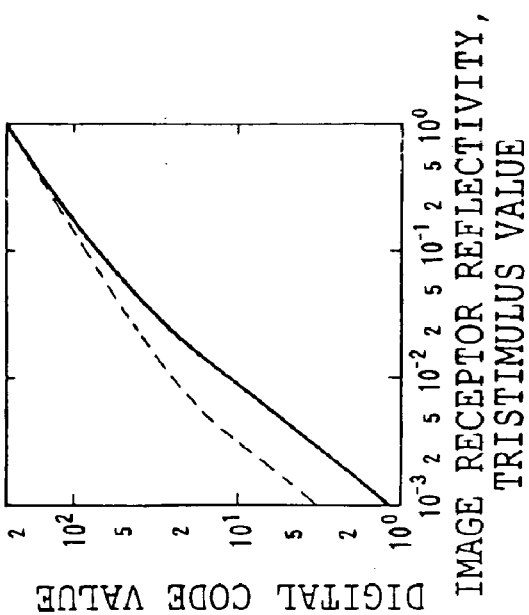

Formula (11) expresses the conversion characteristics shown by the broken line in FIGS. 1A–1C. Moreover, the values of each constant are not limited to those in formula (3) and formula (11) but may be optionally set.

Further, as the recording medium of the present embodiment described above, the CD-ROM 52 and the hard disk contained in the hard disk device 50 were given as examples, however, the present invention is not limited to these and various appropriate information recording media can be used as the recording medium of the present invention, including-magnetic disks such as floppy disks, optical disks such as CD-R, magnetic optical disks such as MO, memory cards, and IC cards.

Moreover, the CPU 40 of the image data converter 14 was used in the above explanation to execute the image correction program to perform the image correction process, however, the present invention is not limited to this, and dedicated hardware (an image processing circuit) for performing image correction processing may be provided, and the image correction processing performed using the image processing circuit.

The explanation given above was also of a case when the color correction and density correction were calculated automatically, however, the present invention is not limited to this, and the color correction and density correction may be performed on the basis of color correction and density correction determined by displaying an image on a display means such as a display unit, and having an operator examine the displayed image.

The data processed in the above explanation was image data created by photography using a digital camera, however, the present invention is not limited to this and the present invention may be used for the color correction and density correction of a variety of image data in which the relationship in each pixel between the digital code values and the light intensity values or the logarithm of light intensity values is linear, such as image data obtained, for example, by reading a film image recorded on a photographic film. In this case as well, the conversion characteristics in the first and third conversions may be determined in accordance with the relationship between the digital code values and the light intensity values.

As was explained above, the first and fourth aspects of the present invention possess the excellent effect of performing a first conversion to convert the digital signal values of each pixel of the image data representing the image to be corrected to values having a linear relationship with the light intensity values or the light intensity logarithm values, then performing a second conversion on the image data which has undergone the first conversion so that at least one of the color and the density of the image to be corrected is corrected, and finally performing a third conversion on the image data which has undergone the second conversion so that the values of each pixel are all restored to digital signal values, whereby color correction or density correction can be performed without changing the gradation of an image.

In the second aspect of the present invention, at least one of the first or third conversions in the first aspect of the present invention is performed, with A, B, C as the digital code values and A', B', C' as values having a linear relationship with the light intensity values, in accordance with the relational formula $$A=e(a\cdot A')\ B=e(a\cdot B')\ C=e(a\cdot C')$$

when the digital code values A, B, C are not greater than a predetermined value f, and in accordance with the relational formula $$A=e(b\cdot A'^c-d)\ B=e(b\cdot B'^c-d)\ C=e(c\cdot C'^c-d)$$

when the digital code values A, B, C are greater than a predetermined value f. Therefore, in addition to the effect mentioned above, the present invention also possesses the effect that when the image data representing the image to be corrected is image data whose digital code values have been determined according to conversion characteristics defined by the above relational formulas, at least one of the first or third conversions can be performed with a high degree of accuracy.

In the fifth aspect of the present invention, a program for executing on a computer a process including: a first step for carrying out a first conversion in which the digital signal values for each pixel of the image data representing the image to be corrected are each converted to values whose relationship with the light intensity values or the light intensity logarithm values is linear; a second step for carrying out a second conversion in which at least one of the color and density of the image data which has undergone the first conversion is corrected; and a third step for carrying out a third conversion in which the values of each pixel of the image data which has undergone the second conversion are restored to digital signal values is recorded on a recording medium allowing color correction and density correction to be performed without changing the gradation of the image.

What is claimed is:

1. An image correction method, comprising:

performing a first conversion in which digital code values of each pixel of image data representing an image to be corrected are converted to values whose relationship with light intensity values or light intensity logarithm values is linear;

performing a second conversion in which at least one of the color or density of said image to be corrected which is represented by said image data is corrected after said image data has undergone said first conversion; and a third conversion in which the values of each pixel of said image data are restored to said digital code values after said image data has undergone said second conversion, wherein the image data is corrected without changing the gradation of the image.

2. An image correction method according to claim 1, wherein said image data is obtained by converting values of the light intensity or values related to the light intensity of each component color of each pixel of said image to be corrected to digital code values A, B, C in accordance with predetermined conversion conditions, and wherein, when A', B', C' are values having a linear relationship with the light intensity values, at least one of said first conversion or said third conversion is performed in accordance with the relational formula $$A=e(a\cdot A')\ B=e(a\cdot B')\ C=e(a\cdot C')$$

when the digital code values A, B, C are not greater than a predetermined value f, and in accordance with the relational formula $$A=e(b\cdot A'^c-d)\ B=e(b\cdot B'^c-d)\ C=e(c\cdot C'^c-d)$$

when the digital code values A, B, C are greater than a predetermined value f, when a, b, c, d, e, f are constants.

3. An image correction method according to claim 1, wherein said second conversion is an affine transformation.

4. The image correction method according to claim 1, wherein the step of performing the first conversion includes correcting each component color of each pixel of image data representing an image to be corrected to values whose relationship with light intensity values or light intensity logarithm values is linear.

5. The image correction method according to claim 1, wherein the each pixel data for the image data includes values of (R, G, B) color components, and wherein the step of performing the first conversion includes converting each component color (R, G, B) of each pixel is converted to corresponding image receptor reflectivity data (r, g, b).

6. The image correction method according to claim 5, wherein the reflectivity values (r, g, b) are related to the color component values (R, G, B) by function F(x) such that $$F(x)=e\cdot a\cdot x,\text{ for } (0.0 \leq x \leq f), \text{ and}$$

$$F(x)=e(b\cdot x^c-d) \text{ for } (f<x\leq 1.0),$$

wherein x is the reflectivity value (r, g, b) of individual color component (r, g, b) for the pixel, F(x) is the value (R, G, B) of individual color component for the pixel, e is a constant value representing a bit depth of the color component, and a, b, c, d, and f are constants.

7. The image correction method according to claim 6, wherein converting each component color (R, G, B) of each pixel to corresponding image receptor reflectivity data (r, g, b) is accomplished by applying an inverse function $F^{-1}$ of the function F(X) to each color component.

8. The image correction method according to claim 7, wherein the step of performing the first conversion further includes converting the image receptor reflectivity data (r, g, b) into corresponding tristimulus values (X, Y, Z) by the following matrix calculation $$\begin{bmatrix} X \\ Y \\ Z \end{bmatrix} = \begin{bmatrix} m_{11} & m_{12} & m_{13} \\ m_{21} & m_{22} & m_{23} \\ m_{31} & m_{32} & m_{33} \end{bmatrix}^{-1} \begin{bmatrix} r \\ g \\ b \end{bmatrix}$$

wherein matrix elements $m_{11}$–$m_{33}$ are constants.

9. The image correction method according to claim 8, wherein $m_{11}$=3.2410, $M_{12}$=−1.5374, $m_{13}$=−0.4986, $m_{21}$=0.9692, $m_{22}$=1.8760, $m_{23}$=0.0416, $m_{31}$=0.0556, $m_{32}$=−0.2040, and $m_{33}$=1.0570.

10. The image correction method according to claim 8, further including calculating average value [Y] of the Y channel of the tristimulus values (X, Y, Z) prior to performing the second conversion.

11. The image correction method according to claim 10, wherein the tristimulus values (X, Y, Z) are old tristimulus values and the step of performing the second conversion includes converting the old tristimulus values into new tristimulus values (X', Y', Z') by at least one of density correction and offset adjustment.

12. The image correction method according to claim 11, wherein density corrections is achieved by applying the following matrix operation $$\begin{bmatrix} X' \\ Y' \\ Z' \end{bmatrix} = \begin{bmatrix} K_r X \\ K_g y \\ K_b Z \end{bmatrix}$$

and offset adjustment is achieved by applying the following matrix operation $$\begin{bmatrix} X' \\ Y' \\ Z' \end{bmatrix} = \begin{bmatrix} K_1 \\ K_2 \\ K_3 \end{bmatrix} + \begin{bmatrix} X \\ Y \\ Z \end{bmatrix}$$

wherein $K_r$, $K_g$, $K_b$, $K_1$, $K_2$, and $K_3$ are conversion coefficients.

13. The image correction method according to claim 12, wherein in applying density correction matrix operation, $X_r=1$, $K_g=0.18/[Y]$, and $K_b=1$.

14. The image correction method according to claim 12, wherein the step of performing the third conversion includes converting the new tristimulus values (X', Y', Z') to corrected image receptor reflectivity data (r', g', b') by the following matrix calculation $$\begin{bmatrix} r' \\ g' \\ b' \end{bmatrix} = \begin{bmatrix} m_{11} & m_{12} & m_{13} \\ m_{21} & m_{22} & m_{23} \\ m_{31} & m_{32} & m_{33} \end{bmatrix} \begin{bmatrix} X' \\ Y' \\ Z' \end{bmatrix}$$

wherein matrix elements $m_{11}$–$m_{33}$ are constants.

15. The image correction method according to claim 14, wherein $m_{11}=3.2410$, $m_{12}=-1.5374$, $m_{13}=-0.4986$, $m_{21}=0.9692$, $m_{22}=1.8760$, $m_{23}=0.0416$, $M_{31}=0.0556$, $M_{32}=0.2040$, and $m_{33}=1.0570$.

16. The image correction method according to claim 14, wherein the step of performing the third conversion includes converting the corrected image receptor reflectivity data (r', g', b') to corrected color component data (R', G', B') by applying F(x') such that $F(x')=e \cdot a \cdot x'$, for $(0.0 \leq x' \leq f)$, and $F(x')=e(b \cdot x'^c - d)$ for $(f < x' \leq 1.0)$, wherein x' is the individual corrected reflectivity data value (r', g', b') for the pixel, F(x') is the value (R', G', B') of the corrected color component for the pixel, e is a constant value representing a bit depth of the color component, and a, b, c, d, and f are constants.

17. The image correction method according to claim 7, the method further comprising converting luminance pixel data in form of (Y, Cr, Cb) into corresponding color component data (R, G, B) prior to the step of converting the color component data (R, G, B) to corresponding receptor reflectivity data (r, g, b).

18. The image correction method according to claim 17, wherein the step of converting the (Y, Cr, Cb) data to (R, G, B) data includes:

determining values for Luma, Chroma 1, and Chroma 2, wherein the relationship is such that $Y=Ky \cdot Luma$, $Cr=K_{Cr} \cdot Chroma\ 1 + C_{Cr}$, and $Cb=K_{Cb} \cdot Chroma\ 2 + C_{Cb}$, and wherein $K_Y$, $K_{Cr}$, $K_{Cb}$, $C_{Cr}$, and $C_{Cb}$ are constants; and applying a matrix calculation in the form of $$\begin{bmatrix} R \\ G \\ B \end{bmatrix} = \begin{bmatrix} m_{11} & m_{12} & m_{13} \\ m_{21} & m_{22} & m_{23} \\ m_{31} & m_{32} & m_{33} \end{bmatrix}^{-1} \begin{bmatrix} Luma \\ Chroma\ 1 \\ Chroma\ 2 \end{bmatrix}$$

wherein matrix elements $m_{11}$–$m_{33}$ are constants.

19. The image correction method according to claim 18, wherein $m_{11}=0.299$, $m_{12}=0.587$, $m_{13}=0.114$, $m_{21}=-0.299$, $m_{22}=-0.587$, $m_{23}=0.886$, $m_{31}=0.701$, $m_{32}=-0.587$, $m_{33}=-0.114$, $K_Y=(255/1.402)$, $K_{Cr}=111.40$, $K_{Cb}=135.64$, $C_{Cr}=156$, and $C_{Cb}=137$.

20. The image correction method according to claim 18, wherein the step of performing the second conversion includes:

calculating average image receptor reflectivity values for [r], [g], and [b] for each color; and performing affine transformation on individual image receptor reflectivity data (r, g, b) to determine corrected image receptor reflectivity data (r', g', b'), wherein the affine transformation is such that $$\begin{bmatrix} r' \\ g' \\ b' \end{bmatrix} = \frac{K_a[g]}{K_r[r]+K_g[g]+K_b[b]} \begin{bmatrix} 1/[r] & 0 & 0 \\ 0 & 1/[g] & 0 \\ 0 & 0 & 1/[b] \end{bmatrix} \begin{bmatrix} r \\ g \\ b \end{bmatrix}$$

wherein $K_a$, $K_r$, $K_g$, and $K_b$ are constants.

21. The image correction method according to claim 20, wherein $K_a=0.18$, $K_r=0.3$, $K_g=0.6$, and $K_b=0.1$.

22. The image correction method according to claim 20, wherein the step of performing the third conversion includes converting the corrected image receptor reflectivity data (r', g', b') to corrected color component data (R', G', B') by applying F(x') such that $F(x')=e \cdot a \cdot x'$, for $(0.0 \leq x' \leq f)$, and $F(x')=e(b \cdot x'^c - d)$ for $(f < x' \leq 1.0)$, wherein x' is the individual corrected reflectivity data value (r', g', b') for the pixel, F(x') is the value (R', G', B') of the corrected color component for the pixel, e is a constant value representing a bit depth of the color component, and a, b, c, d, and f are constants.

23. The image correction method according to claim 22, the method further comprising converting corrected color component data (R', G', B') to corresponding corrected luminance data (Y', Cr', Cb') for each pixel.

24. The image correction method according to claim 23, wherein the step of converting the (R', G', B') data to (Y', Cr', Cb') data includes:

determining values for Luma', Chroma 1', and Chroma 2' by applying a matrix calculation in the form of $$\begin{bmatrix} Luma \\ Chorma\ 1 \\ Chorma\ 2 \end{bmatrix} = \begin{bmatrix} m_{11} & m_{12} & m_{13} \\ m_{21} & m_{22} & m_{23} \\ m_{31} & m_{32} & m_{33} \end{bmatrix}^{-1} \begin{bmatrix} R' \\ B' \\ G' \end{bmatrix}$$

wherein matrix elements $m_{11}$–$m_{33}$ are constants; and determining values for Y', Cr', and Cb' based on Luma', Chroma 1', and Chroma 2', wherein the relationship is such that $Y'=K_Y' \cdot Luma'$, $Cr'=K_{Cr}' \cdot Chroma\ 1' + C_{Cr}'$, and $Cb'=K_{Cb}' \cdot Chroma\ 2' + C_{Cb}'$, and wherein $K_Y'$, $KC_{Cr}'$, $K_{Cb}'$, $C_{Cr}'$, and $C_{Cb}'$ are constants.

25. The image correction method according to claim 24, wherein $m_{11}=0.299$, $m_{12}=0.587$, $m_{13}=0.114$, $m_{21}=-0.299$, $m_{22}=-0.587$, $m_{23}=0.886$, $m_{31}=0.701$, $m_{32}=-0.587$, $m_{33}=-0.114$, $K_Y=(255/1.402)$, $K_{Cr}=111.40$, $K_{Cb}=135.64$, $C_{Cr}=156$, and $C_{Cb}=137$.

26. The image correction method according to claim 6, wherein a set of constants (a, b, c, d, e, f) is one of (4.5, 1.099, 0.45, 0.099, 255, 0.018) and (12.92, 1.055, 1/2.40, 0.055, 255, 0.0034).

27. An image correction device comprising:
   first conversion means for performing a first conversion in which digital signal values of each pixel of image data representing an image to be corrected are converted to values whose relationship with light intensity values or light intensity logarithm values is linear;
   second conversion means for performing a second conversion in which at least one of the color or density of said image to be corrected which is represented by said image data is corrected after said image data has undergone said first conversion; and
   third conversion means for performing a third conversion in which the values of each pixel of said image data are restored to said digital signal values after said image data has undergone said second conversion,
   wherein the image correction device corrects the image without changing the gradation of the image.

28. The image correction device of claim 27, wherein the first conversion means converts digital signal values of each component color of each pixel of image data representing an image to be corrected are converted to values whose relationship with light intensity values or light intensity logarithm values is linear.

29. A recording medium on which is recorded a program for executing on a computer a process including:
   a first step for carrying out a first conversion in which digital signal values for each pixel of image data representing an image to be corrected are each converted to values whose relationship with the light intensity values or the light intensity logarithm values is linear;
   a second step for carrying out a second conversion in which at least one of the colors or density of said image to be corrected which is represented by said image data is corrected; and
   a third step for carrying out a third conversion in which the values of each pixel of image data which has undergone said second conversion are restored to said digital signal values,
   wherein image data is corrected without changing the gradation of the image.

30. The recording medium of claim 29, wherein the first step includes carrying out the first conversion in which digital signal values for each pixel of image data representing an image to be corrected are each converted to values whose relationship with the light intensity values or the light intensity logarithm values is linear.

* * * * *